(12) United States Patent
Wu et al.

(10) Patent No.: US 9,307,042 B2
(45) Date of Patent: Apr. 5, 2016

(54) ORCHESTRATION SERVER FOR VIDEO DISTRIBUTION NETWORK

(75) Inventors: Shuai Wu, Waltham, MA (US); Jack Jianxiu Hao, Lexington, MA (US); Wei Xia, Sudbury, MA (US); Zhiying Jin, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 304 days.

(21) Appl. No.: 13/313,051

(22) Filed: Dec. 7, 2011

(65) Prior Publication Data

US 2013/0151655 A1 Jun. 13, 2013

(51) Int. Cl.
*G06F 15/16* (2006.01)
*H04L 29/08* (2006.01)
*H04L 29/06* (2006.01)
*H04N 21/235* (2011.01)
*H04N 21/254* (2011.01)
*H04N 21/2543* (2011.01)
*H04N 21/643* (2011.01)

(52) U.S. Cl.
CPC ........ *H04L 67/2823* (2013.01); *H04L 65/4084* (2013.01); *H04L 67/2838* (2013.01); *H04N 21/2358* (2013.01); *H04N 21/2541* (2013.01); *H04N 21/2543* (2013.01); *H04N 21/64322* (2013.01); *H04L 67/303* (2013.01)

(58) Field of Classification Search
CPC .............. H04L 63/104; H04L 67/1097; H04L 67/2842; H04L 67/2823; H04L 12/6418; H04L 67/10; H04L 65/105; H04L 65/4084; H04L 12/2838; H04L 2209/60; H04N 21/4622; H04N 21/6405; H04N 21/441
USPC ......................................................... 709/217
See application file for complete search history.

(56) References Cited

U.S. PATENT DOCUMENTS

| | | | |
|---|---|---|---|
| 6,742,043 B1 * | 5/2004 | Moussa et al. ................. | 709/232 |
| 8,863,173 B2 * | 10/2014 | Jing ..................... | H04L 12/2812 725/34 |
| 2008/0109524 A1 * | 5/2008 | Meadows ................ | H04L 67/02 709/207 |
| 2009/0089296 A1 * | 4/2009 | Stemeseder et al. ............ | 707/10 |
| 2010/0125590 A1 * | 5/2010 | Puranik et al. ................. | 707/758 |
| 2011/0083157 A1 * | 4/2011 | Addair .......................... | 725/120 |
| 2011/0258049 A1 * | 10/2011 | Ramer et al. ............... | 705/14.66 |
| 2012/0129517 A1 * | 5/2012 | Fox et al. ....................... | 455/425 |
| 2014/0006951 A1 * | 1/2014 | Hunter ................... | H04H 60/31 715/719 |

* cited by examiner

*Primary Examiner* — Khanh Dinh
*Assistant Examiner* — S M Rahman

(57) ABSTRACT

A computing device receives, from a user device, a data call, and forwards the data call to a backend network device. The computing device receives, from the backend network device, a response to the data call in a first format. The computing device identifies a type of the user device and converts the response from the first format into a second format to create a reformatted response. The reformatted response addresses compatibility issues or simplifies processing by the user device. The computing device sends the reformatted response to the user device.

19 Claims, 11 Drawing Sheets

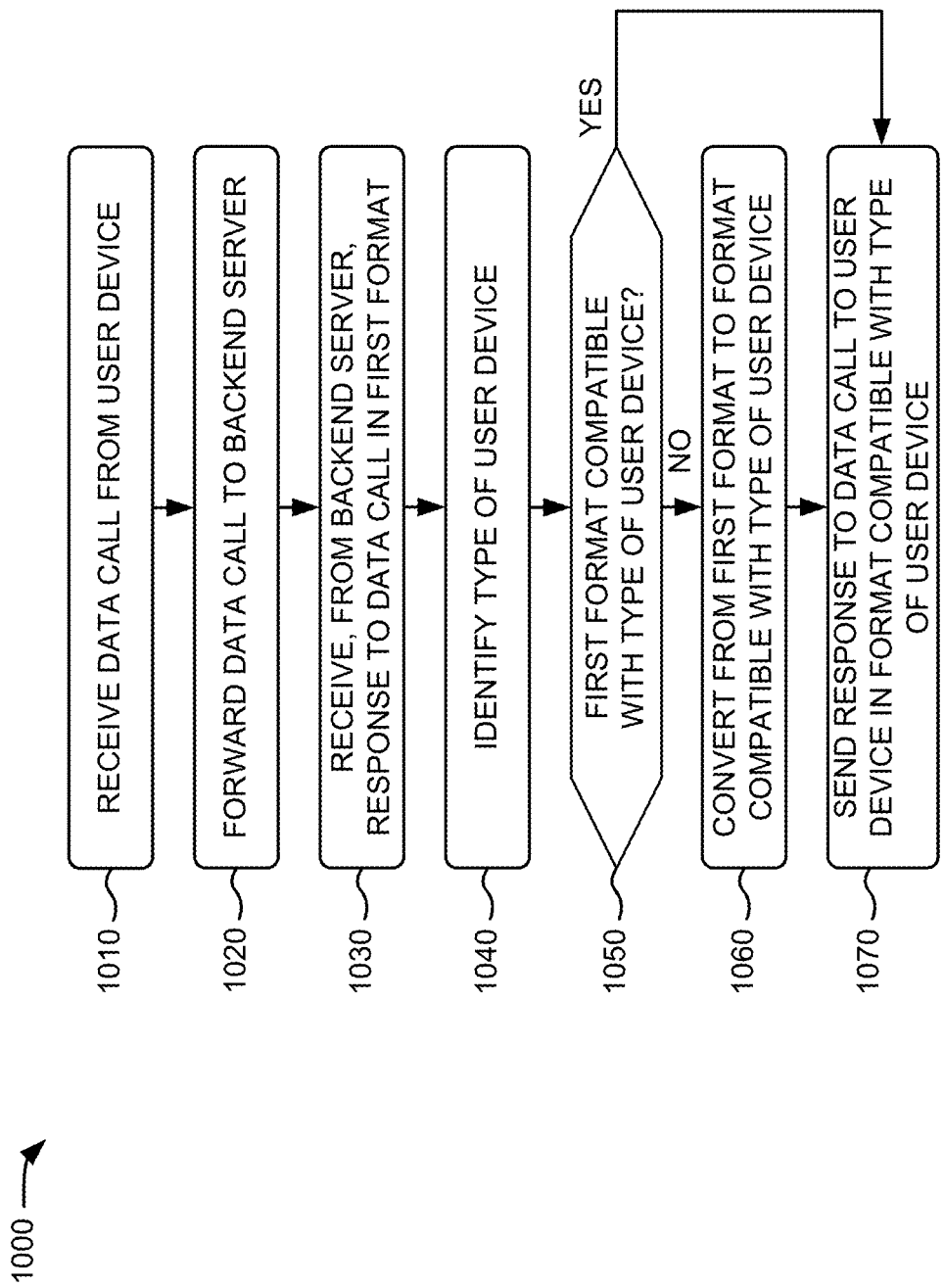

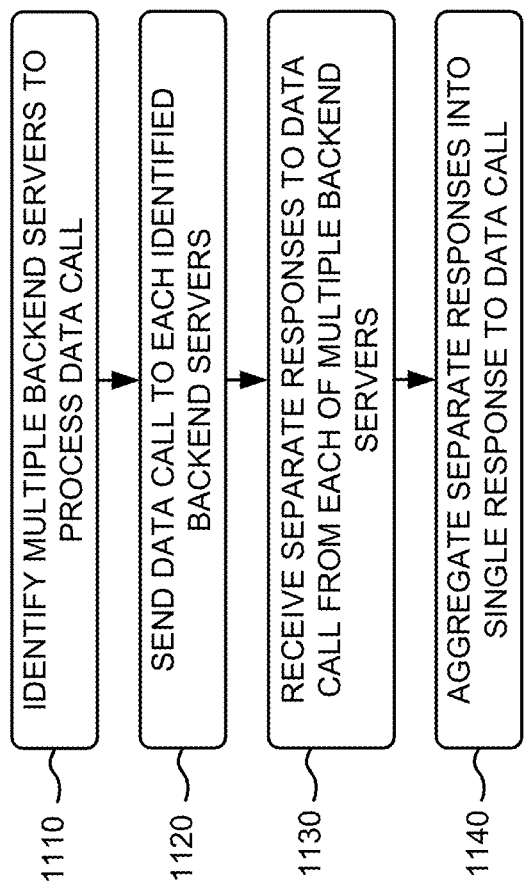

ORCHESTRATION SERVER FOR VIDEO DISTRIBUTION NETWORK

BACKGROUND

The trend of convergence between mobile devices and the Internet is accelerating. More Internet services, including video purchasing/renting services, are migrating to mobile devices as smartphones and tablets become more popular among consumers.

BRIEF DESCRIPTION OF THE DRAWINGS

FIGS. 10 and 11 are flow charts of exemplary processes for providing a proxy service that links client applications to backend services according to an implementation described herein.

DETAILED DESCRIPTION OF PREFERRED EMBODIMENTS

The following detailed description refers to the accompanying drawings. The same reference numbers in different drawings may identify the same or similar elements.

Systems, and/or methods/or described herein may provide a server layer linking the application client programs to back-end services in a video services network. The systems and/or methods may receive, from a user device, a data call, and may forward the data call to a backend network device. The systems and/or methods may receive, from the backend network device, a response to the data call in a first format. The systems and/or methods may identify a type of user device and may convert the response from the first format into a second format to create a reformatted response. In one implementation, the reformatted response may address compatibility issues and/or simplify processing by the user device. The systems and/or methods may send the reformatted response to the user device.

Figure 1:
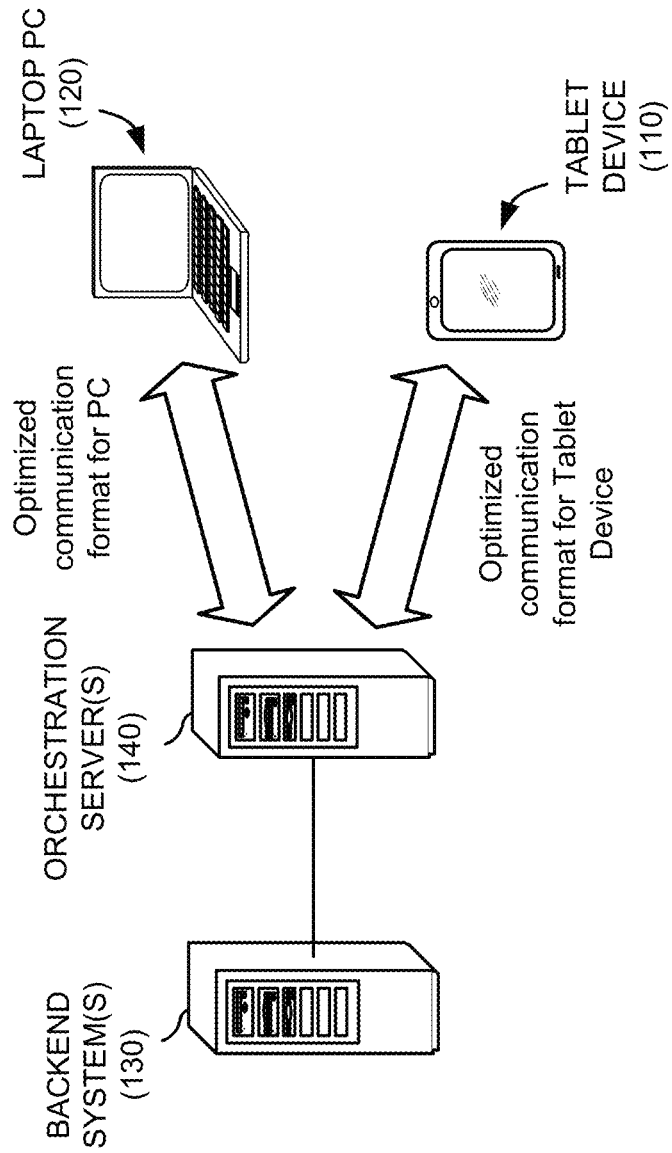
FIG. 1 is an illustration of a concept described herein.

FIG. 1 provides an illustration of concepts described herein. Referring to FIG. 1, different types of user devices (e.g., a tablet device 110 and a laptop computer 120) may use different protocols and/or operating systems. Backend systems 130 may provide services (e.g., Internet-based services, such as video content distribution services) to the user devices. Some Internet services were designed before the mobile era and were designed for computer users. These services may be based on assumptions that a user device's web browser is sophisticated enough to handle heavy processing loads; and some of these services might even require an agent installation on the user devices. While these assumptions may provide adequate performance for some user devices (e.g., laptop PC 120), performance on other user devices (e.g., tablet device 110) may suffer. To obtain optimal performance, and due to the variations in hardware and software of user devices, it is beneficial to shift heavy processing requirements for these services to the server side and let user devices handle only a front end user interface.

In an implementation described herein, an orchestration sever 140 may provide a proxy service (e.g., a server layer) linking the client application on the user devices with backend systems 130. Backend systems 130 can communicate with orchestration server 140 using any preferred format, and orchestration server 140 may communicate with the respective user devices (e.g., tablet device 110 and laptop computer 120) using protocols appropriate for the particular user device. Additionally, orchestration server 140 may provide a unified interface for the user device to communicate with different devices in backend systems 130.

As used herein, the term "user" is intended to be broadly interpreted to include a user device (e.g., a mobile communication device) or a user of a user device.

Figure 2:
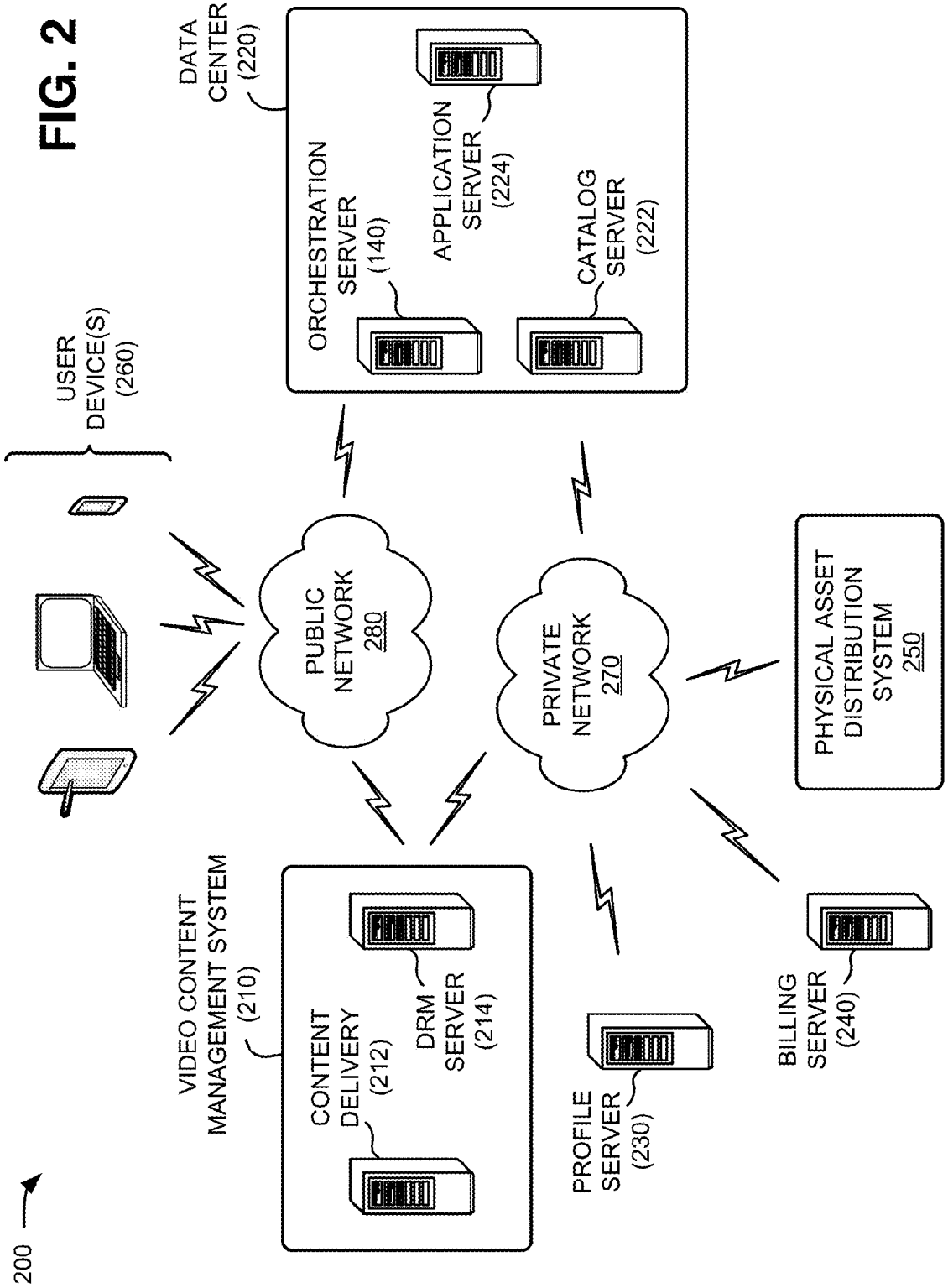
FIG. 2 is a diagram of an exemplary network in which systems and/or methods described herein may be implemented.

FIG. 2 is an exemplary network 200 in which an embodiment described herein may be implemented. Network 200 may generally represent user devices connected to a video content distribution network. As illustrated, network 200 may include a video content management system (VCMS) 210, a data center 220, a profile server 230, a billing server 240, a physical asset distribution system 250, user devices 260, a private network 270, and a public network 280. The particular arrangement and number of components of network 200 shown in FIG. 2 are illustrated for simplicity. In practice there may be more VCMSs 210, data centers 220, profile servers 230, billing servers 224, physical asset distribution systems 250, orchestration servers 140, user devices 260, and/or networks 270/280. Components of network 200 may be connected via wired and/or wireless links VCMS 210 may include one or more network devices, or other types of computation or communication devices, to aggregate content and content metadata, process content, and distribute content. In one implementation, VCMS 210 may include a content delivery system 212 and a digital rights management (DRM) server 214. VCMS 210 may aggregate content and transcode content into a digital format suitable for consumption on particular user devices 260. For example, VCMS 210 may include a transcoding device to convert a video file from one format to another (e.g., from one bit rate to another bit rate, from one resolution to another, from one standard to another, from one file size to another, etc). VCMS 210 may also encrypt data and communicate with DRM server 214 to enforce digital rights.

Content delivery system 212 may include one or more network devices, or other types of computation or communication devices, to deliver digital content from a backend server to user devices 260. In one implementation, content delivery system 212 may include a streaming server that provides streaming data packets (e.g., via a streaming URL) to user devices 260 (e.g., via network 270). In one implementation, a streaming URL may be session-based, such that each URL can be used only once for one user device 260 for security purposes.

DRM server 214 may include one or more network devices, or other types of computation or communication devices, to issue, validate, and/or enforce DRM licenses to a client, such as an application running on one of user devices 260. In implementations herein, DRM server 214 may communicate with user device 260 to authenticate a user of user device 260, the particular user device 260, and/or an application residing on user device 260. For example, DRM server 214 may request/receive login information associated with the user, and compare the login information with stored information to authenticate the user. Additionally, or alternatively, DRM server 214 may request/receive device information (e.g., a unique device identifier) associated with user device 260, and may compare the device information with stored information to authenticate user device 260.

Data center 220 may include one or more network devices, or other types of computation or communication devices, to manage the authorization, selection, and/or purchase of multimedia content by a user of user devices 260. As shown in FIG. 2, data center 220 may include orchestration server 140, a catalog server 222 and an application server 224. In one implementation, data center 220 may be accessed by user devices 260 via public network 280.

Catalog server 222 may include one or more network devices, or other types of computation or communication devices (e.g., a server device, an application server device, a Web server device, a database server device, a computer, etc.), to provide a unified catalog of both digital and physical content for users (e.g., of user devices 260) to consume (e.g., buy, rent, or subscribe). In one implementation, catalog server 222 may collect and/or present listings of video content available to user devices 260. For example, catalog server 222 may receive digital and/or physical content metadata, such as lists or categories of content, from VCMS 210 and/or physical asset distribution system 250. Catalog server 222 may use the content metadata to provide currently-available content options to user devices 260. Catalog server 222 may provide the content metadata to user device 260 directly or may communicate with user device 260 via application server 224.

Application server 224 may include one or more network devices, or other types of computation or communication devices (e.g., a server device, an application server device, a Web server device, a database server device, a computer, etc.), to provide a backend support system for mobile applications residing on user devices 260. For example, application server 224 may permit user device 260 to download a video application that may permit a user to find content of interest or play downloaded or streaming content. The video application may enable user device 260 to present to a user of user device 260 information received from data center 220 in an interactive format to allow selection of particular digital or physical content. Additionally, or alternatively, application server 224 may provide content metadata, such as lists or categories of content. Also, application server 224 may authenticate a user who desires to purchase, rent, or subscribe to digital or physical content. In one implementation, the interactions between application server 224 and user device 260 may be performed using hypertext transfer protocol (HTTP) or secure HTTP (HTTPS) via public network 280.

Orchestration server 140 may include one or more network devices, or other types of computation or communication devices (e.g., a server device, an application server device, a Web server device, a database server device, a computer, etc.), to link user devices 260 with other devices in network 200, such as catalog server 222, application server 224, profile server 230, billing server 240, etc. Orchestration server 140 is described further in connection with, for example, FIGS. 3-9.

Profile server 230 may include one or more network devices, or other types of computation or communication devices, to store user profile information for users (e.g., users of user devices 260). The user profile information may include various information regarding a user, such as login information (e.g., a user identifier and a password), billing information, address information, types of services to which the user has subscribed, a list of digital/physical content purchased by the user, a list of video content rented by the user, a list of video content to which the user has subscribed, a user device identifier (e.g., a media player identifier, a mobile device identifier, a set top box identifier, a personal computer identifier) for user device 260, a video application identifier associated with the video application obtained from application server 224, or the like. Application server 224 may use the user profile information from profile server 230 to authenticate a user and may update the user profile information based on the user's activity (e.g., with a user's express permission).

Billing server 240 may include one or more network devices, or other types of computation or communication devices, to manage charging users for services provided via network 200. Billing server 240 may include, for example, a payment processing component, a billing component, and/or a settlement component.

Physical asset distribution system 250 may include one or more network devices, or other types of computation or communication devices, to track availability of physical content (e.g., DVDs, Blu-ray discs, memory cards, etc.) and provide metadata of physical content for inclusion in catalog information provided to users of user devices 260. In one implementation, physical asset distribution system 250 may also provide physical asset information, such as location information, so that when a user wants to buy a physical asset, the system can direct the user to the nearest geographic location (e.g., to retrieve the physical asset).

VCMS 210, content delivery system 212, DRM server 214, data center 220, catalog server 222, application server 224, profile server 230, billing server 240, physical asset distribution system 250, and orchestration server 140 may be referred to herein generally as backend servers.

User device 260 may include a computation or communication device to enable a user to view video content or interact with another user device 260 or a video display device (e.g., a set-top box and/or television). User device 260 may include, for example, a personal communications system (PCS) terminal (e.g., a smart phone that may combine a cellular radiotelephone with data processing and data communications capabilities), a tablet computer, a smart phone, a personal computer, a laptop computer, a gaming console, a vehicular communication system, an Internet television, a digital video recorder (DVR) rental terminal, or other types of computation or communication devices. In one implementation, user device 260 may include a client-side application that enables user device 260 to communicate with, for example, VCMS 210 or data center 220 and present information received from VCMS 210/data center 220 to a user. The client-side application may permit a user of user device 260 to log into an account (e.g., via application server 224), access catalog information (e.g., from catalog server 222), submit an order, and/or consume live streaming or downloaded video content (e.g., from VCMS 210).

Private network 270 may include, for example, one or more private IP networks that use a private IP address space. Private network 270 may include a local area network (LAN), an intranet, a private wide area network (WAN), etc. In one implementation, private network 270 may implement one or more Virtual Private Networks (VPNs) for providing communication between, for example, any of VCMS 210, data center 220, profile server 230, billing server 240, and/or physical asset distribution system 250. Private network 270 may be protected and/or separated from other networks, such as public network 280, by a firewall. Although shown as a single element in FIG. 2, private network 270 may include a number of separate networks.

Public network 280 may include a local area network (LAN), a wide area network (WAN), such as a cellular network, a satellite network, a fiber optic network, or a combination of the Internet and a private WAN, etc. that is used to transport data. Although shown as a single element in FIG. 2, public network 280 may include a number of separate networks that provide services to user devices 260.

Although FIG. 2 shows exemplary components of network 200, in other implementations, network 200 may include fewer components, different components, differently-arranged components, and/or additional components than those depicted in FIG. 2. Alternatively, or additionally, one or more components of network 200 may perform one or more tasks described as being performed by one or more other components of network 200. For example, in one implementation, the functions of orchestration server 140, catalog server 222, and/or application server 224 may be combined in a single device or distributed among a group of devices.

Figure 3:
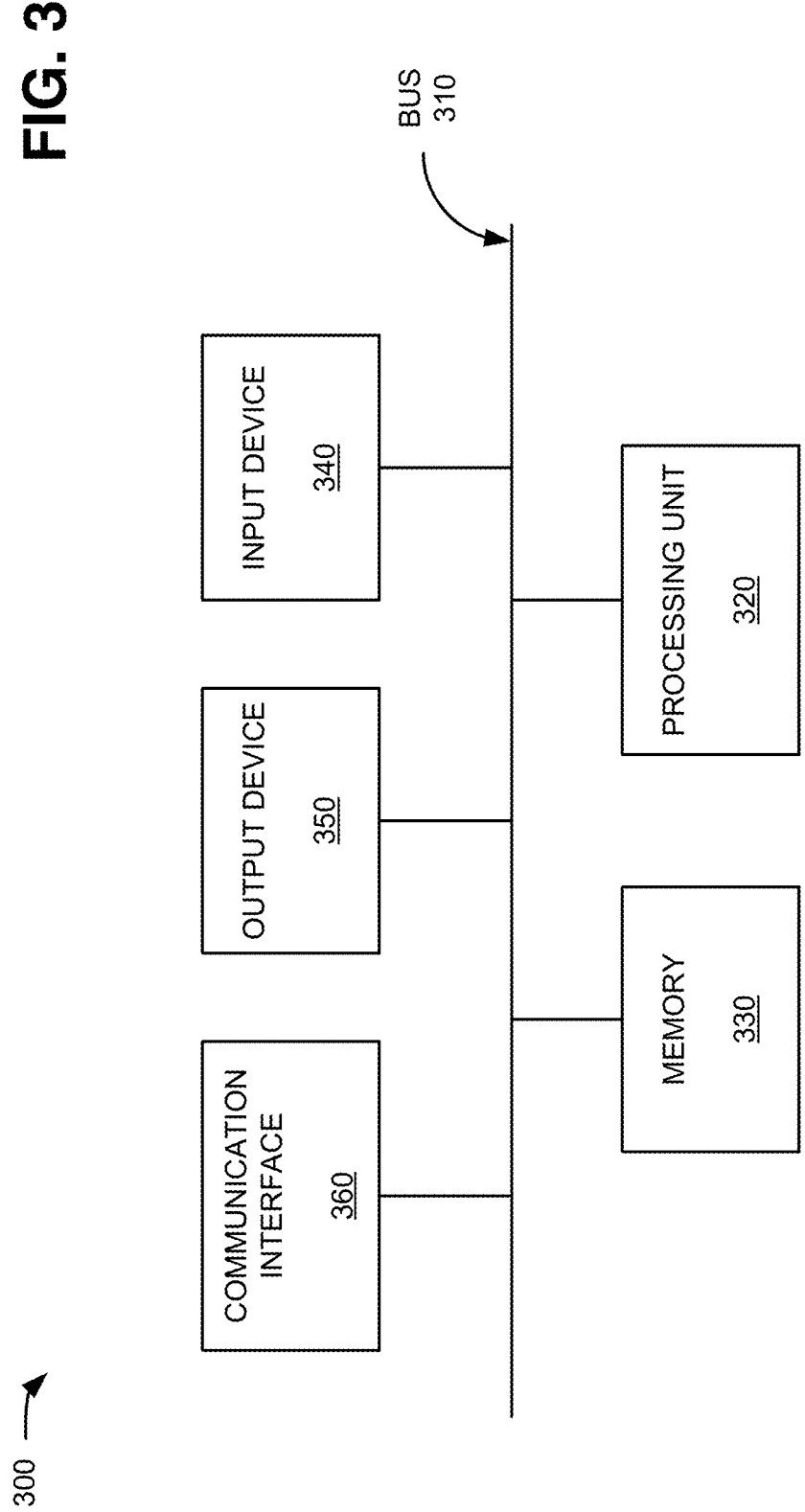
FIG. 3 is a diagram of exemplary components of one or more of the devices of the network depicted in FIG. 2.

FIG. 3 is a diagram of example components of a device 300 that may correspond to any one of the components of network 200. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage medium that stores information and instructions for execution by processing unit 320, a read only memory (ROM) or another type of static storage medium that stores static information and instructions for processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other components of network 200.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3. As an example, in some implementations, input device 340 and/or output device 350 may not be implemented by device 300. In these situations, device 300 may be a "headless" device that does not explicitly include an input or an output device. Alternatively, or additionally, one or more components of device 300 may perform one or more other tasks described as being performed by one or more other components of device 300.

Figure 4:
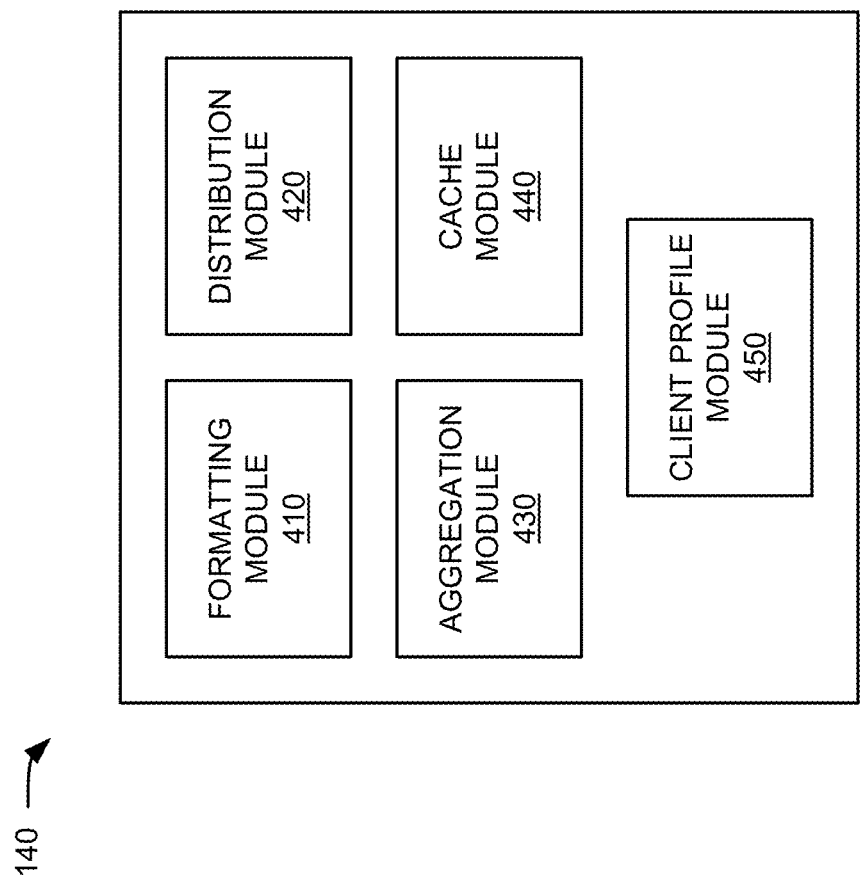
FIG. 4 is a diagram of exemplary functional components of an orchestration server of the network depicted in FIG. 2.

FIG. 4 is a diagram of example functional components of orchestration server 140. In one implementation, the functions described in connection with FIG. 4 may be performed by one or more components of device 300 (FIG. 3). As shown in FIG. 4, orchestration server 140 may include a formatting module 410, a distribution module 420, an aggregation module 430, a cache module 440, and a client profile module 450.

Formatting module 410 may receive information (e.g., responses to data calls initiated by user devices 260) from backend servers in network 200 (e.g., content delivery system 212, DRM server 214, catalog server 222, application server 224, profile server 230, billing server 240, and/or physical asset distribution system 250). For example, formatting module 410 may receive a Web service response (e.g., a video catalog listing responsive to a data call from one of user devices 260) from a backend server (e.g., catalog server 222). Formatting module 410 may identify a type of device (or operating system) being used on user device 260. Formatting module 410 may determine the type of user device, for example, based on information in the data call, or information previously provided by user device 260 (such as login information and/or account profile information associated with user device 260). In one implementation, formatting module 410 may include a table, database, or another data structure that maps types of devices to operating systems and/or other information. In another implementation, device type information obtained during a login or registration process may include operating system and/or application version information.

Based on the type of user device 260, formatting module 410 may reformat the contents of the Web service response according to the user device needs to ensure compatibility and/or simplify processing by user device 260. For example, if the Web service response is provided from a backend server in SOAP (e.g., formerly defined as Simple Object Access Protocol) format as a default, formatting module 410 may reformat the Web services response to Extensible Markup Language (XML) format, JavaScript Object Notation (JSON) format, or another format; or pass through the SOAP format, depending on the type of user device 260. Additionally, or alternatively, formatting module 410 may receive client requests (e.g., data calls) from user devices 260 and, if necessary, may reformat the client requests into a unified format before forwarding to backend servers in network 200.

Distribution module 420 may provide a unified interface to user device 260 and call multiple backend servers based on a single data call from user device 260. For example, distribution module 420 may receive a data call (e.g., from one of user devices 260) and identify multiple backend servers that need to respond to the call. Distribution module 420 may forward the data call (e.g., either simultaneously or serially, depending on the context) to each of the multiple backend servers.

Thus, distribution module 420 may allow a user device to make a single data call and access multiple responsible backend servers. Furthermore, backend servers (e.g., backend servers 510) may have different formats; orchestration server 140 (e.g., distribution module 420 in conjunction with formatting module 410) handles these different formats and converts the different formats to provide one unified format to user device 260.

Aggregation module 430 may provide aggregated results to user device 260 in a uniformed format. In one implementation, if a response to user device 260 involves input from multiple backend servers, aggregation module 430 may receive the input from each backend server, compile the input, and provide the input to user device 260. For example, if user device 260 provides a keyword search request (e.g., for a video catalog) that spans multiple forms of content, the search may require a query by multiple catalog servers (e.g., catalog servers 222). Each of the catalog servers may provide search results to orchestration server 140, which may, in turn, compile the search results into a single file. In one implementation, aggregation module 430 may provide the file to formatting module 410 for distribution to user device 260 in the appropriate format (e.g., consistent with the particular type of user device 260).

Cache module 440 may provide a short-term cache for relatively static results from backend servers. For example, cache module may temporarily store responses from backend servers and/or aggregated results (e.g., from aggregation module 430). Cache module 440 may respond to subsequent identical requests using data stored in cache module 440 to provide better response rates (e.g., better than if additional communications with backend servers were required). Cache module 440 may delete or overwrite data from temporary storage after a predetermined time, which may correspond to, for example, a refresh rate of data accessed by backend servers in network 200.

Client profile module 450 may collect client behavior data that may be used for multiple business purposes. In one implementation, client profile module 450 may include an "opt in" requirement to enable a user of user device 260 to permit collection of client behavior data. Client behavior data may include, for example, content viewed on a particular user device 260, viewing times of content on a particular user device, applications used, catalog usage data (e.g., searches performed, items browsed), user feedback, etc. Client profile module 450 may collect client behavior data and provide the data (or subsets of the data) to one or more data collection servers.

Although FIG. 4 shows example functional components of orchestration server 140, in other implementations, orchestration server 140 may include fewer functional components, different functional components, differently-arranged functional components, and/or additional functional components than depicted in FIG. 4. Alternatively, or additionally, one or more functional components of orchestration server 140 may perform one or more tasks described as being performed by one or more other functional components of orchestration server 140.

Figure 5:
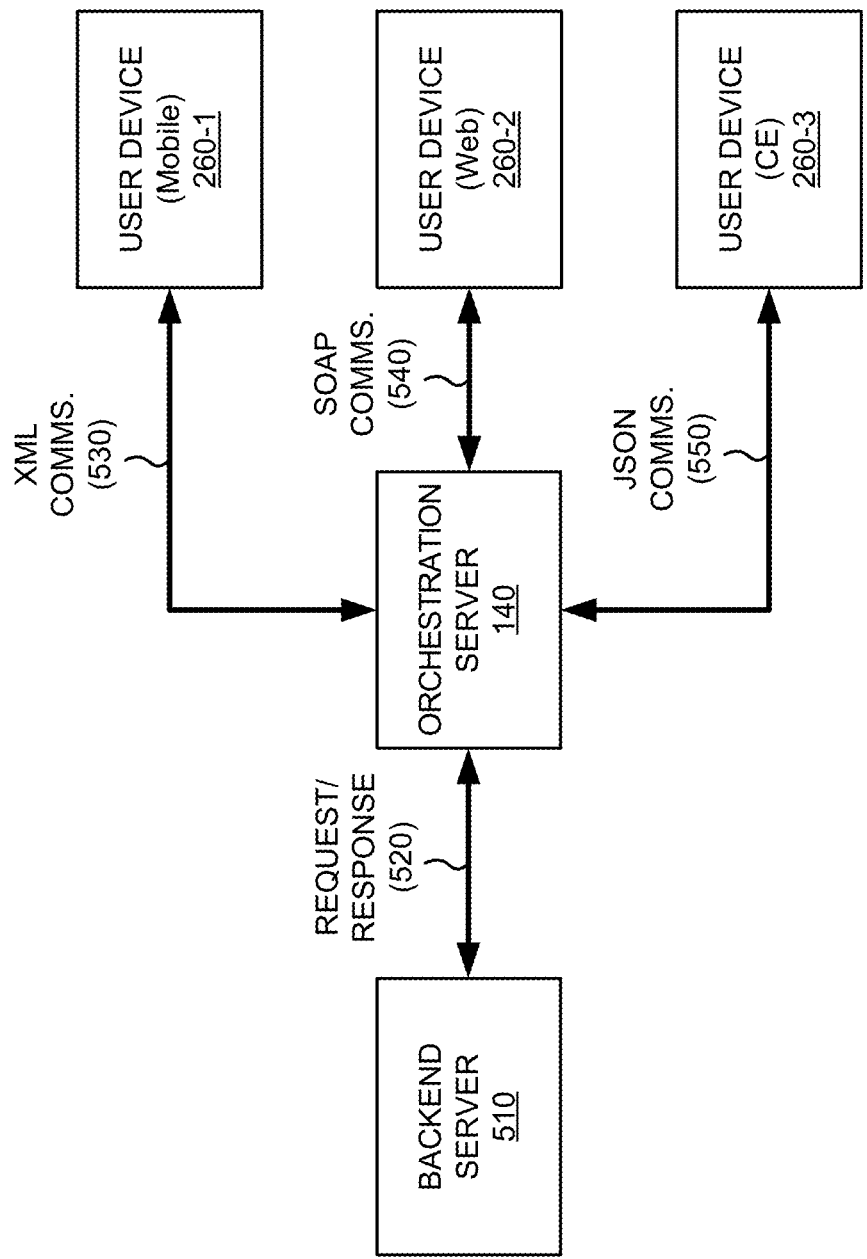
FIG. 5 is a diagram of exemplary communications among a portion of the network of FIG. 2 to relay requests from mobile devices.

FIG. 5 is a diagram of exemplary communications among a portion 500 of network 200. As shown in FIG. 5, network portion 500 may include three user devices 260 (indicated as user devices 260-1, 260-2 and 260-3), orchestration server 140, and a backend server 510. The particular arrangement and number of components of network portion 500 are illustrated for simplicity. In practice there may be more user devices 260, orchestration servers 140, and/or backend servers 510.

Communications in FIG. 5 may include communications to relay requests between user devices 260 and a backend server 510. User devices 260 may each include different front-end client applications. In examples described herein, user device 260-1 may include a mobile device operating system (e.g., Google's Android OS, Apple's iOS, etc.); user device 260-2 may include a laptop computer using a full-featured web browser/operating system; and user device 260-3 may include a device using a Microsoft Windows CE operating system. Backend server 510 may include, for example, one or more of VCMS 210, content delivery system 212, DRM server 214, data center 220, catalog server 222, application server 224, profile server 230, billing server 240, and physical asset distribution system 250.

As shown in FIG. 5, backend server 510 may generate request/response communications 520. Request/response communications 520 may include, for example, communications to support an application (e.g., a front-end application for a video content delivery system) running on one of user devices 260. In one implementation, request/response 520 may include a Web services exchange in conformance with standards of the World Wide Web Consortium. For example, request/response communications 520 may include a remote call (e.g., a SOAP over HTTP call) to invoke a set of application programing interfaces (APIs) for backend server 510 to extract and return video catalog information. Backend server 510 may receive request/response communications 520 in any format, such as XML, SOAP, JSON, or another format. Request/response communications 520 may also include responsive communications from backend server 510 to orchestration server 140 in any format.

XML communications 530 may include communications between an application (e.g., a front-end application for a video content delivery system) running on user device 260-1 and orchestration server 140. XML communications 530 may provide, for example, a data-exchange format (e.g., XML-RPC) optimally supported by a mobile device operating system running on user device 260-1.

SOAP communications 540 may include communications between an application (e.g., a front-end application for a video content delivery system) running on user device 260-2 and orchestration server 140. SOAP communications 540 may provide, for example a data-exchange format (e.g., SOAP) optimally supported by a full-featured web browser interface running on user device 260-2.

JSON communications 550 may include communications between an application (e.g., a front-end application for a video content delivery system) running on user device 260-3 and orchestration server 140. JSON communications 550 may provide, for example, a data-exchange format (e.g., JSON) optimally supported by a Window CE operating system running on user device 260-3.

In one implementation, orchestration server 140 (e.g., formatting module 410) may receive request/response communications 520 and may reformat the contents of request/response communications 520, depending on the type of client operating system employed by user devices 260, before forwarding the response to the respective user device 260. As shown in FIG. 5, orchestration server 140 may reformat request/response communication 520 into XML communications 530 for user device 260-1 (assuming request/response communications 520 are directed to user device 260-1). Similarly, orchestration server 140 may reformat request/response communication 520 into SOAP communications 540 for user device 260-2 (assuming request/response communications 520 are directed to user device 260-2) and may reformat request/response communications 520 into JSON communications 550 for user device 260-3 (assuming request/response communications 520 are directed to user device 260-3). Thus, orchestration server 140 may reformat or pass through the contents of request/response 520 based on needs of the particular user device 260 to simplify the processing needs of user devices 260.

In another implementation, orchestration server 140 (e.g., formatting module 410) may receive XML communications 530, SOAP communications 540, and/or JSON communications 550 from user devices 260 and may reformat the contents of XML communications 530, SOAP communications 540, and/or JSON communications 550 into a different format depending on the type of communications format employed by backend servers 510. Thus, orchestration server 140 may reformat or pass through the contents of XML communications 530, SOAP communications 540, and/or JSON communications 550 in a unified format as request/response communications 520 to reduce the processing burden on backend servers 510.

Figure 6:
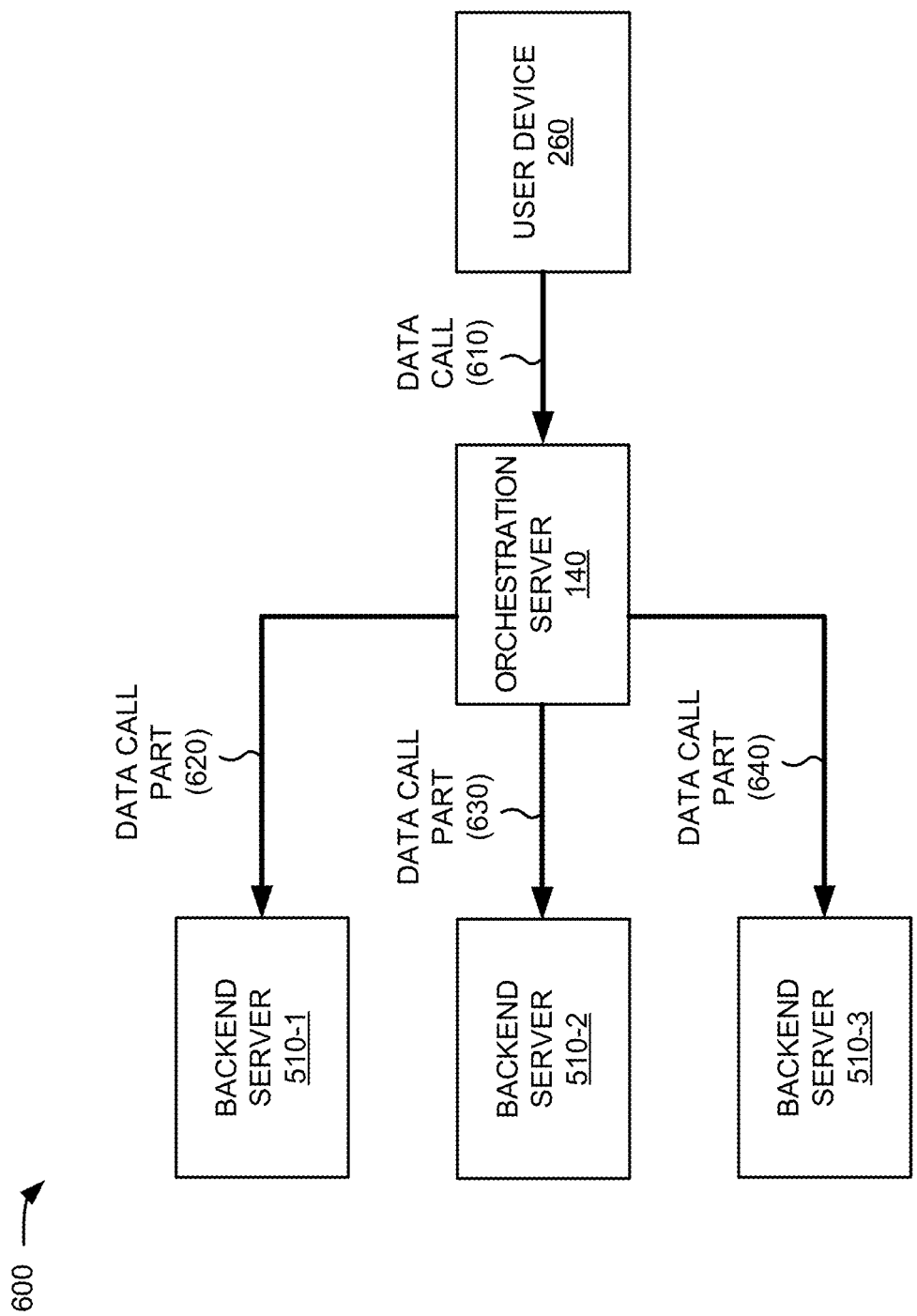
FIG. 6 is a diagram of exemplary communications among another portion of the network of FIG. 2.

FIG. 6 is a diagram of exemplary communications among a portion 600 of network 200. As shown in FIG. 6, network portion 600 may include one user device 260, orchestration server 140, and three backend servers 510 (indicated as backend servers 510-1, 510-2 and 510-3). The particular arrangement and number of components of network portion 600 are illustrated for simplicity. In practice there may be more user devices 260, proxy servers 140, and/or backend servers 510.

Communications in FIG. 6 may include communications to provide a unified interface between a user device 260 and multiple backend servers 510. User device 260 and backend servers 510 may include features described above in connection with any of FIGS. 1-5.

As shown in FIG. 6, orchestration server 140 (e.g., distribution module 420) may receive a data call 610 (e.g., an HTTP data call that may correspond to any of XML communications 530, SOAP communications 540, and/or JSON communications 550 from user devices 260) using a format supported by a type of client operating system employed by user devices 260. For example, data call 610 may include XML-RPC, SOAP, JSON, or another format. Data call 610 may require processing/responses by different backend servers 510. For example, data call 610 may include a search query (e.g., for a video catalog, profile data, etc.) that may require searches by multiple servers (e.g., multiple catalog servers 222, catalog server 222 and application server 224, etc.) or one of multiple possible servers.

Orchestration server 140 (e.g., distribution module 420) may distribute data call 610 to backend servers 510-1, 510-2, and/or 510-3, as indicated by reference numbers 620, 630, and 640, respectively. Orchestration server 140 may, for example, identify the requirements of data call 610 and forward data call 610 to one or more particular backend servers 510 that are configured to process data call 610. For example, if a data call includes search criteria indicating two separate database systems, orchestration server 140 may forward data call 610 to a backend servers 510 associated with each database system. Thus, orchestration server 140 may provide a unified interface to user device 260 and can call different backend servers 510 depending on the content of data call 610. In one implementation, orchestration server 140 may reformat the content of data call 610, as described above with respect to FIG. 5, before forwarding the content of data call 610.

Figure 7:
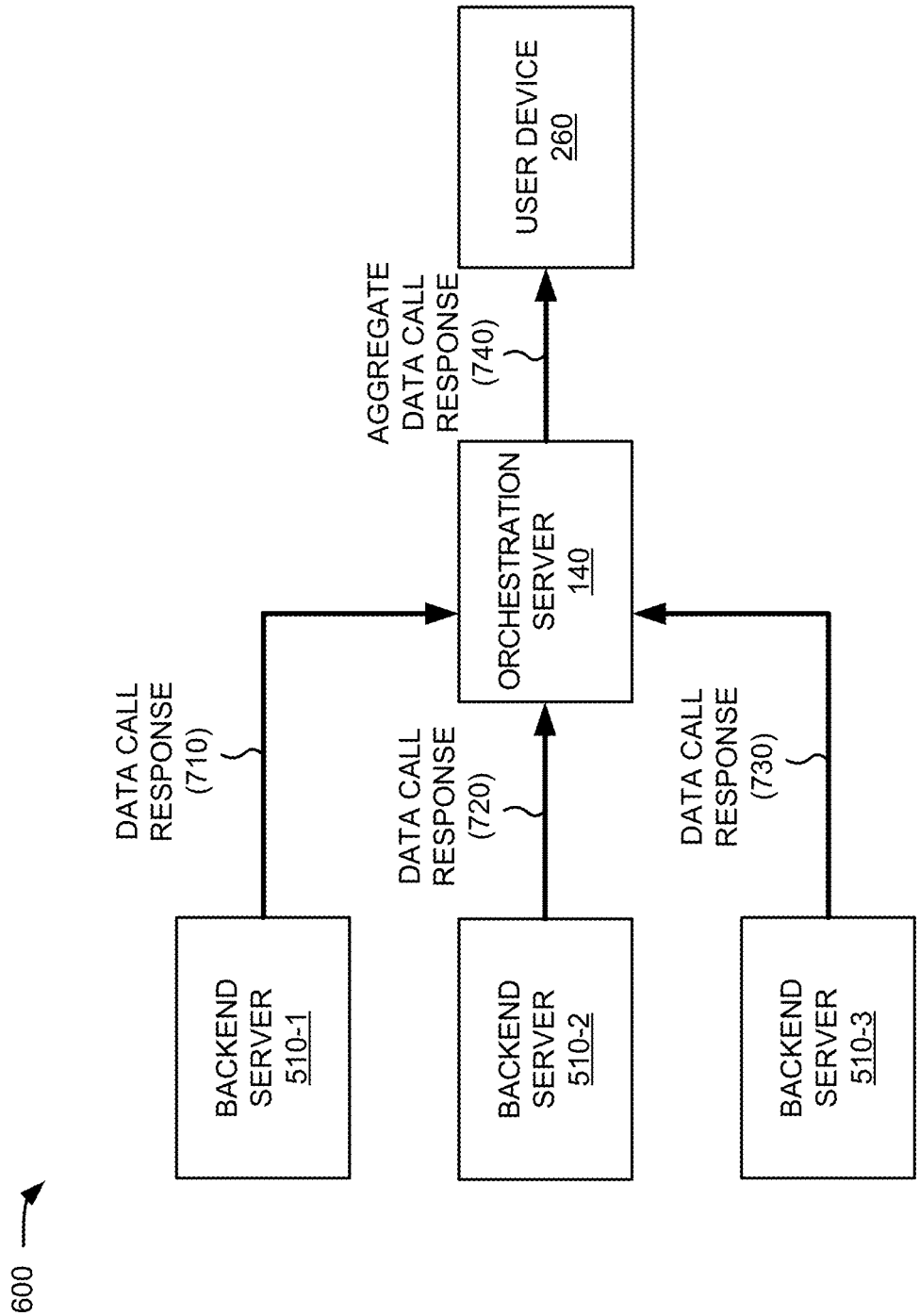
FIG. 7 is a diagram of additional exemplary communications among the portion of the network of FIG. 6.

FIG. 7 is a diagram of further exemplary communications among portion 600 of network 200. Communications in FIG. 7 may include communications to provide results aggregation from multiple backend servers 510 to user device 260.

As shown in FIG. 7, orchestration server 140 (e.g., aggregation module 430) may receive a data call response 710 from backend server 510-1, a data call response 720 from backend server 510-2, and a data call response 730 from backend server 510-3. Each of data call responses 710, 720, and 730 may include, for example, a response to a data call (e.g., data call 610 of FIG. 6) generated by user device 260. Orchestration server 140 may aggregate information from data call responses 710, 720, and 730, may process the aggregated information, and may pack the aggregated information for an application client on user device 260 to consume. Orchestration server 140 may format the packed information into a unified format (e.g., XML-RPC, SOAP, JSON, or another format suitable for the application client on user device 260) and may forward the aggregated information to user device 260 as an aggregated data call response 740. In instances when user device 260 is communicating over a connection with limited bandwidth (e.g., a wireless access network), use of orchestration server 140 may reduce the number of data calls and/or data call responses exchanged over the wireless access network (e.g., when compared to requiring multiple separate data calls between user device 260 and backend servers 510-1, 510-2, and 510-3).

In one implementation, aggregation by orchestration server 140 may involve sequential and multiple data calls to backend servers 510 in order to form the final unified results (e.g., aggregated data call response 740). For example, data call response 710 may return search results corresponding to a keyword search from user device 260. Data call 720 may correspond to retrieving a user profile and preferences. Backend server 510-3 may be a recommendation engine. Thus, the search results obtained from data call response 710 and user preferences from data call response 720 may be passed to backend server 510-3, and orchestration server 140 may receive back the recommended search results through data call response 730. Finally, the response to the keyword search is sent back to user device 260 as the aggregated data call response 740.

Figure 8:
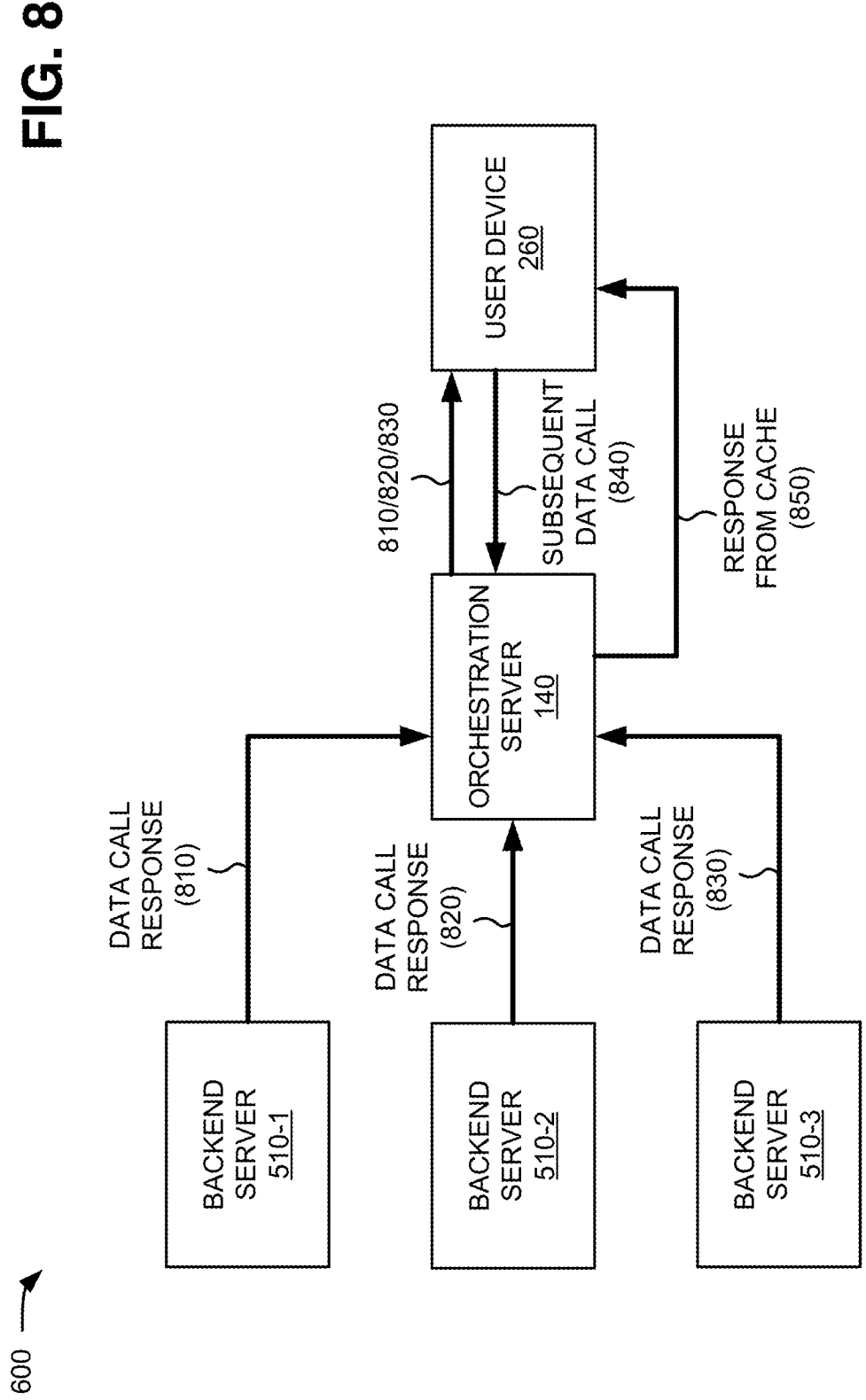
FIG. 8 is a diagram of further exemplary communications among the portion of the network of FIG. 6.

FIG. 8 is a diagram of further exemplary communications among portion 600 of network 200. Communications in FIG. 8 may include communications to implement a short term cache. In response to a data call (not shown), orchestration server 140 may receive data call responses 810, 820, and 830 from backend servers 510-1, 510-2, and 510-3, respectively. In one implementation, orchestration server 140 may aggregate data call responses 810, 820, and 830 (e.g., as shown in FIG. 7). Orchestration server 140 may forward data call responses 810, 820, and 830 (e.g., either aggregated or separately) to user device 260. Orchestration server 140 (e.g., cache module 440) may also temporarily store certain types of data from data call responses 810, 820, and 830 in a local cache (e.g., memory 330 of FIG. 3). In one implementation, orchestration server 140 may store data from data call responses 810, 820, and 830 for a set time period that is less than or equal to a refresh rate of the corresponding data stored on backend servers 510-1, 510-2, and 510-3.

As shown in FIG. 8, user device 260 may generate a subsequent data call 840. Assuming subsequent data call 840 requests data originally included in data call responses 810, 820, or 830, and further assuming that subsequent data call 840 is provided before an expiration period for the local cache, orchestration server 140 (e.g., cache module 440) may retrieve responsive data from the local cache and provide a response from cache 850 to user device 260. Use of the local cache may provide a faster response time and improved user experience for user device 260.

Figure 9:
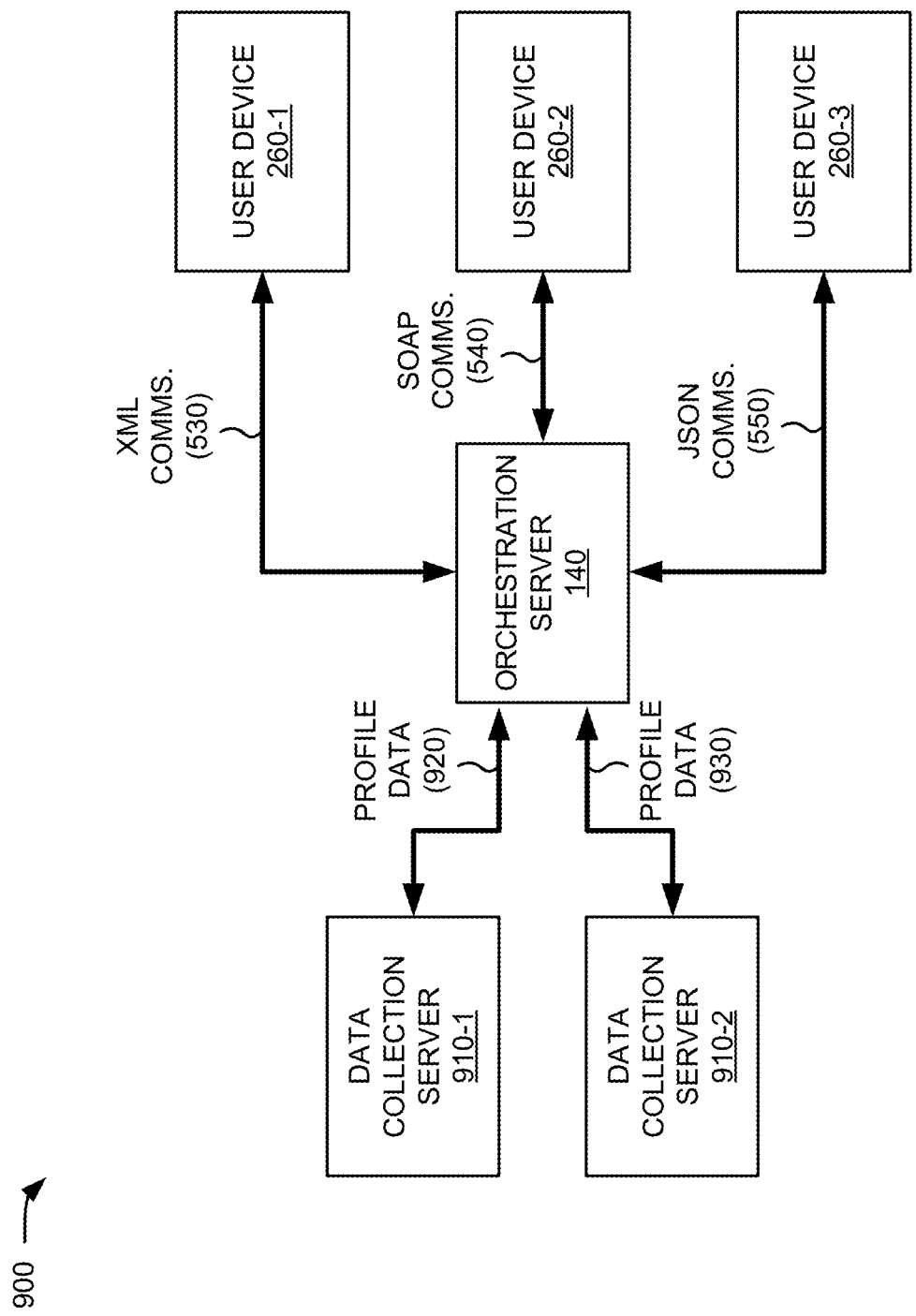
FIG. 9 is a diagram of exemplary communications among yet another portion of the network of FIG. 2.

FIG. 9 is a diagram of exemplary communications among portion 900 of network 200. As shown in FIG. 9, network portion 900 may include three user devices 260 (indicated as user devices 260-1, 260-2, and 260-3), orchestration server 140, and two data collection servers 910 (indicated as data collection servers 910-1 and 910-2). The particular arrangement and number of components of network portion 900 are illustrated for simplicity. In practice there may be more user devices 260, orchestration servers 140, and/or data collection servers 910.

Communications in FIG. 9 may include communications to collect client profile data. Data collection servers 910 may be implemented by, for example, one or more devices associated with VCMS 210, data center 220, profile server 230, billing server 240, and physical asset distribution system 250. In another implementation, data collection server 910 may be associated with another network (e.g., other than network 200) and/or other business uses.

As shown in FIG. 9, orchestration server 140 may receive XML communications 530, SOAP communications 540, and/or JSON communications 550. Orchestration server 140 may reformat or pass through the contents of XML communications 530, SOAP communications 540, and/or JSON communications 550 to one or more backend servers (not shown in FIG. 9). Based on XML communications 530, SOAP communications 540, and/or JSON communications 550, orchestration server 140 (e.g., client profile module 450) may collect client behavior data associated with user devices 260. For example, orchestration server 140 may extract information from data calls in XML communications 530, SOAP communications 540, and/or JSON communications 550 that reflect user input, such as requests for video catalog data, catalog browsing activities, video content orders, user ratings/feedback, etc.

Orchestration server 140 may provide the collected client behavior data to one or more of data collection servers 910, as indicated by references numbers 920 and 930. In one implementation, profile data 920 and profile data 930 may include the same data distributed to different data collection servers 910 (e.g., data collection servers 910-1 and 910-2, respectively). In another implementation, orchestration server 140 may parse the collected client behavior data such that profile data 920 and profile data 930 include different (and possibly overlapping) subsets of the collected client behavior data.

FIGS. 10 and 11 are flow charts of an exemplary process 1000 for providing a proxy service that links client applications to backend services according to an implementation described herein. In one implementation, process 1000 may be performed by orchestration server 140. In another implementation, some or all of process 1000 may be performed by another device or group of devices, including or excluding orchestration server 140.

As illustrated in FIG. 10, process 1000 may include receiving a data call from a user device (block 1010), forwarding the data call to a backend server (block 1020), and receiving, from the backend server, a response to the data call in a first format (block 1030). For example, orchestration server 140 may receive a data call from user devices 260 that may correspond to any of XML communications 530, SOAP communications 540, and/or JSON communications 550. Orchestration server 140 may forward the data call to backend server 510, and may receive a response to the data call from backend server 510 (e.g., via request/response communications 520) in a format such as SOAP, XML, or JSON.

As further shown in FIG. 10, process 1000 may include identifying a type of the user device (block 1040), and determining if the first format is compatible with the type of user device (1050). For example, orchestration server 140 may (e.g., formatting module 410) may identify a type of device (an operating system, a client application, a version thereof, etc.) being used on user device 260 and may reformat the contents of the Web service response according to the device needs to simplify processing by user device 260. Orchestration server 140 may determine the type of device, the operating system, etc., for example, based on information in the data call, or information previously provided by user device 260 (such as login information and/or account profile information associated with user device 260).

If the first format is not compatible with the type of user device (1050—NO), process 1000 may also include converting the response from the first format to a format compatible with the type of user device (block 1060). After the response is converted, or if the first format is compatible with the type of user device (1050—YES), process 1000 may include sending the response to the data call to the user device in the format compatible with the type of user device (block 1070). For example, in implementations described above in connection with FIG. 5, orchestration server 140 (e.g., formatting module 410) may receive request/response communications 520 and may reformat the contents of request/response communications 520, depending on the type of client operating system employed by user devices 260, before forwarding the response to the respective user device 260.

Process blocks 1020 and 1030 may include the process blocks depicted in FIG. 11. As shown in FIG. 11, process blocks 1020/1030 may include identifying multiple backend severs to process the data call (block 1110) and sending the data call to each identified backend server (block 1120). For example, orchestration server 140 (e.g., distribution module 420) may receive a data call 610 (e.g., an HTTP data call that may correspond to any of XML communications 530, SOAP communications 540, and/or JSON communications 550 from user devices 260). Orchestration server 140 may, for example, identify the requirements of data call 610 and forward data call 610 to one or more particular backend servers 510 that are configured to process data call 610, as indicated by reference numbers 620, 630, and 640, respectively.

Process blocks 1020/1030 may also include receiving separate responses to the data call from each of the multiple backend servers (block 1130), and aggregating the separate responses into a single response to the data call (block 1140). For example, orchestration server 140 (e.g., aggregation module 430) may receive a data call response 710 from backend server 510-1, a data call response 720 from backend server 510-2, and a data call response 730 from backend server 510-3. Each of data call responses 710, 720, and 730 may include, for example, a response to a data call (e.g., data call 610 of FIG. 6) generated by user device 260. Orchestration server 140 may aggregate information from data call responses 710, 720, and 730, may process the aggregated information, and may pack the aggregated information for an application client on user device 260 to consume.

Systems and/or methods described herein may provide a server layer that links client applications with backend services of a video content distribution system. The systems and/or methods may relay client requests between backend servers and client user devices to improve overall performance. The systems and/or methods may provide different message formats for different client user devices and may reformat contents based on the type of user device to simplify the processing needs from the user devices. The systems and/or methods may provide a unified interface to the client user devices and may provide results aggregation for requests directed to multiple backend servers. The systems and/or methods may provide a short term cache for relatively static results from backend servers. The systems and/or methods may also collect client behavior data for other business uses.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. Further, while series of acts have been described with respect to FIGS. 10 and 11, the order of the acts may be varied in other implementations. Moreover, non-dependent acts may be implemented in parallel. Additionally, other processes described in this description may be varied and/or acts performed in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device and from a user device, a first data call for a video catalog in a first format that includes one of SOAP format, extensible markup language (XML) format, and JavaScript Object Notation (JSON) format;
   identifying, by the computing device, requirements of the first data call;
   identifying, by the computing device and based on the requirements, multiple backend network devices that are required to process the first data call;
   sending, by the computing device, the first data call to each of the multiple backend network devices in a second format, including one of SOAP format, XML format, and JSON format, that is different than the first format;
   receiving, by the computing device, separate responses to the first data call from each of the multiple backend network devices, wherein the separate responses include data in the second format;
   aggregating, by the computing device, each of the separate responses into an aggregated response to the first data call;
   identifying, by the computing device, a type of the user device and an operating system employed by the user device;
   converting, by the computing device and based on the type of the user device and the operating system employed by the user device, the data in the second format into the first format to create a reformatted aggregated response;
   sending, by the computing device and to the user device, the reformatted aggregated response in the first format;
   storing, in a local cache of the computing device and in the second format, the aggregated response to the first data call, wherein the data from the aggregated response to the first data call is available after sending the reformatted aggregated response;
   receiving, by the computing device and from the user device, a second data call, wherein the second data call includes a second request for data previously included in the aggregated response to the first data call;
   retrieving, from the local cache and after sending the reformatted aggregated response, information responsive to the second data call in the second format;
   converting, by the computing device, the information responsive to the second data call from the second format into the first format to create another reformatted aggregated response; and
   sending, by the computing device and to the user device, the other reformatted aggregated response.

2. The method of claim 1, wherein sending the first data call to each of the multiple backend network devices comprises sending the first data call serially to the multiple backend network devices.

3. The method of claim 1, wherein the first data call is a Web services request from a user device application for a video content delivery system.

4. The method of claim 1, wherein storing the data from the response to the first data call includes:
   storing the data for a period of time that is less than a refresh rate of source data associated with the response to the first data call.

5. The method of claim 1, further comprising:
   extracting user behavior information from the first data call; and
   forwarding, to another one of the multiple backend network devices, the user behavior information.

6. The method of claim 5, wherein the user behavior information includes:
   content viewed on the user device,
   viewing times of the content on the user device, and
   applications used on the user device.

7. A network device, comprising:
   a memory configured to store instructions; and
   a processor configured to execute instructions in the memory to:
      receive, from a user device, a first data call for a video catalog listing in a first format that includes one of SOAP format, extensible markup language (XML) format, and JavaScript Object Notation (JSON) format;
      identify requirements of the first data call;
      identify, based on the requirements, multiple backend network devices that are required to process the first data call;
      send the first data call to each of the multiple backend network devices in a second format, including one of SOAP format, XML format, and JSON format, that is different than the first format;
receive separate responses to the first data call from each of the multiple backend network devices, wherein the separate responses include data in the second format;
aggregate each of the separate responses into an aggregated response to the first data call;
identify, based on a type of the user device and an operating system employed by the user device, a preferred response format for the user device to receive the response to the first data call;
convert the data in the second format into the preferred response format to create a reformatted aggregated response;
send, to the user device, the reformatted aggregated response;
store, in the memory, the data in the second format, wherein the data in the second format is available after sending the reformatted response;
receive, from the user device, a second data call, wherein the second data call includes a second request for the data previously included in the response to the first data call;
retrieve, from the memory and after sending the reformatted response, the data in the first format responsive to the second data call;
convert the data in the second format into the preferred response format to create another reformatted aggregated response; and
send, to the user device, the other reformatted aggregated response.

8. The network device of claim 7, wherein the preferred response format conforms to one of extensible markup language-remote procedure call (XML-RPC) protocol or JavaScript Object Notation (JSON) standards.

9. The network device of claim 7, wherein the user device is one of:
a personal communications system (PCS) terminal,
a tablet computer,
a smart phone,
a personal computer,
a laptop computer,
a gaming console,
a vehicular communication system,
an Internet television, or
a digital video recorder (DVR) rental terminal.

10. The network device of claim 7, wherein the second data call is a Web services request from a front-end application for a video content delivery system.

11. The network device of claim 7, wherein the processor is further configured to:
store the data from the response to the first data call for a period of time that is less than a refresh rate of source data associated with response to the first data call.

12. The network device of claim 7, where the processor is further configured to:
extract user behavior information from the first data call, and
forward, to another backend network device, the user behavior information.

13. The network device of claim 7, wherein the processor is further configured to execute instructions in the memory to:
extract user behavior information from the first data call; and
forward, to another one of the multiple backend network devices, the user behavior information.

14. The network device of claim 13, wherein the user behavior information includes:
content viewed on the user device, and
viewing times of the content on the user device.

15. A non-transitory computer-readable medium, including instructions executable by at least one processor, the computer-readable medium comprising one or more instructions for:
receiving, from a user device, a data call, for a video catalog listing associated with a video content distribution system, the data call including of first format selected from a group of SOAP format, extensible markup language (XML) format, and JavaScript Object Notation (JSON) format;
extracting user behavior information from the data call;
forwarding, in a second format that is different than the first format, the data call to a backend network device that is configured to process the data call, the second format being selected from the group of SOAP format, XML format, and JSON format;
forwarding, to another backend network device, the user behavior information;
receiving, from the backend network device, a response to the data call, wherein the response includes video content information in the second format;
converting the video content information from the second format into the first format;
sending, to the user device, the response including video content information in the first format; and
storing, in a local cache, the response to the data call in the second format, wherein data from the response to the data call is available after sending the response.

16. The non-transitory computer-readable medium of claim 15, wherein the instructions for forwarding the user behavior information further comprise one or more instructions for:
forwarding, to a first backend server, a first subset of the user behavior information; and
forwarding to a second backend server, a second subset of the user behavior information, wherein the second subset includes different information than the first subset.

17. The non-transitory computer-readable medium of claim 15, wherein the instructions for forwarding the data call to a backend network device further comprise one or more instructions for:
sending the data call serially to the multiple backend network devices.

18. The non-transitory computer-readable medium of claim 15, further comprising one or more instructions for:
receiving, from the user device, a second data call, wherein the second data call includes a second request for the data from the response to the data call;
retrieving, from the local cache and after sending the response to the data call, information responsive to the second data call; and
sending, to the user device, the information responsive to the second data call.

19. The non-transitory computer-readable medium of claim 15, wherein the instructions for storing the response to the data call further comprise one or more instructions for:
storing the data from the response to the data call for a period of time that is less than a refresh rate of source data associated with response to the data call.

* * * * *